Feb. 25, 1958 W. A. BEASLEY ET AL 2,824,657
DETACHABLE BUCKET ARRANGEMENT FOR SELF-LOADING VEHICLES
Filed March 3, 1955 2 Sheets-Sheet 1

INVENTORS
William A. Beasley
Ernest W. Holmes, Jr.
Harry W. Jones
BY
Watson Cole Grindle & Watson ATTORNEYS Feb. 25, 1958  W. A. BEASLEY ET AL  2,824,657
DETACHABLE BUCKET ARRANGEMENT FOR SELF-LOADING VEHICLES
Filed March 3, 1955  2 Sheets-Sheet 2
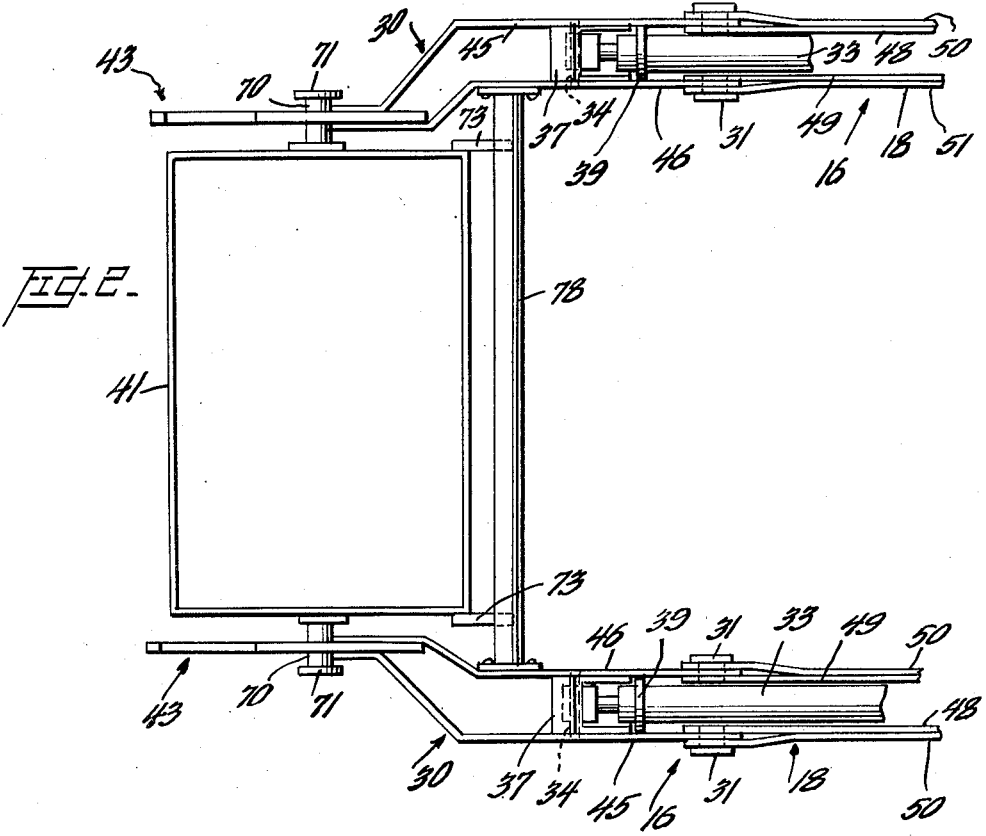
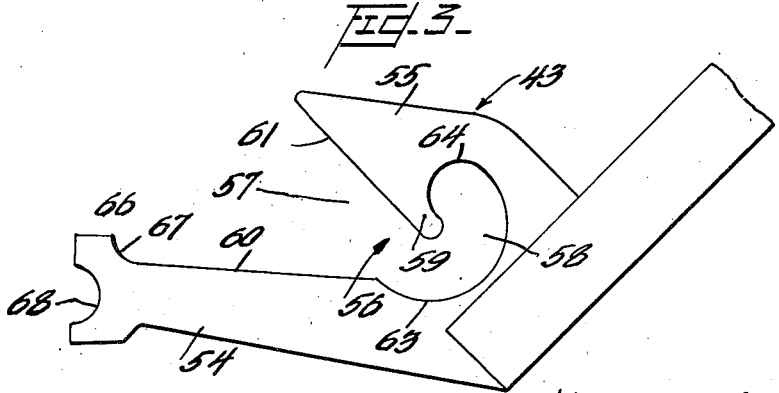
INVENTORS
William A. Beasley
Ernest W. Holmes, Jr.
Harry W. Jones
BY
Watson, Cole, Grindle & Watson
ATTORNEYS

United States Patent Office 2,824,657
Patented Feb. 25, 1958

2,824,657

DETACHABLE BUCKET ARRANGEMENT FOR SELF-LOADING VEHICLES

William A. Beasley, Daisy, Ernest W. Holmes, Jr., Chattanooga, and Harry W. Jones, Knoxville, Tenn.

Application March 3, 1955, Serial No. 491,848

9 Claims. (Cl. 214—302)

This invention relates to self-loading vehicles provided with means for detachably engaging and dumping a bucket, and more particularly to bucket hook means which do not require any moving parts.

In the field of cargo transportation, it has been realized that a most efficient operation can be accomplished with a vehicle which carries its own loading mechanism. More particularly in the field of trash and other waste collecting it has been found that a most efficient operation is one in which the collecting trucks are equipped with mechanism for engaging a trash bucket or container, dumping the contents of the bucket in the cargo body of the truck and releasing the bucket in its original position.

The detachable bucket and hook arrangement contemplated by this invention is particularly adapted for use in connection with vehicle loading mechanism which includes a pair of lifting arms pivotally mounted on opposite sides of the vehicle and a second arm pivotally attached to the free end of each of the lifting arms. Such a double-arm loading mechanism has been previously proposed in the patent of James E. Owen, 2,441,591, issued May 18, 1948, and includes means for rocking the lifting and second arms about their respective pivots so that the free ends of the second arms may be moved between a lowered position extending forwardly of the vehicle and a raised or dumping position in which they are overturned above the cargo body of the vehicle. According to the present invention, the containers or buckets are provided with trunnions extending from opposite sides thereof and a fork-like hook member is attached to the free end of each of said second arms so that the trunnions on the containers may be detachably received within the slots formed between the prongs of the hook members.

When such a fork-like hook member is used with the double arm loading mechanism previously described, the slot between the prongs of each fork opens generally forwardly and upwardly when the hook member is being raised in order to support a bucket during such raising movement. Since the second arms are overturned as they move into the dumping position, the hook members are also overturned so that the slots open generally downwardly in said dumping position. Accordingly, some means are required for supporting the containers within the hook members when in said dumping position.

One purpose of the present invention is to provide a novel hook arrangement for self-loading vehicles whereby a bucket may be detachably engaged and moved into dumping position without requiring any locking operation on the part of the vehicle operator. More specifically, a purpose of the invention is to provide hook members having a novel slot arrangement whereby the bucket trunnions are automatically retained in the slots without the use of any moving parts. A further specific purpose of the invention is to provide hook members having means for engaging the bucket trunnions to maneuver the buckets while on the ground.

According to the previously described arrangement, the bucket trunnions are detachably received within the slots of the hook members so that when the second arms are raised and overturned in the dumping position, the container will thus be moved from the ground into dumping position. However, the previously described arrangement does not provide for overturning the container as it moves into dumping position because the trunnions are free to rotate within the hook slots. Accordingly, a further purpose of the present invention is to provide cooperating means on the container and the loading mechanism whereby said container will be caused to overturn as it moves into dumping position and be turned back as it is lowered so that it will be returned to the ground right side up.

Other and further purposes, features and advantages will be apparent from the following description when read in connection with the accompanying drawings in which, Figure 1 is a side elevational view of a self-loading cargo vehicle equipped with a bucket and hook arrangement according to the invention and showing the loading mechanism in various positions of operation;

Figure 2 is an enlarged top plan view of the front portion of the loading mechanism in the position shown solid in Figure 1;

Figure 3 is an enlarged side elevational view of the hook structure for the loading mechanism in the position shown solid in Figure 1.

Figure 1:
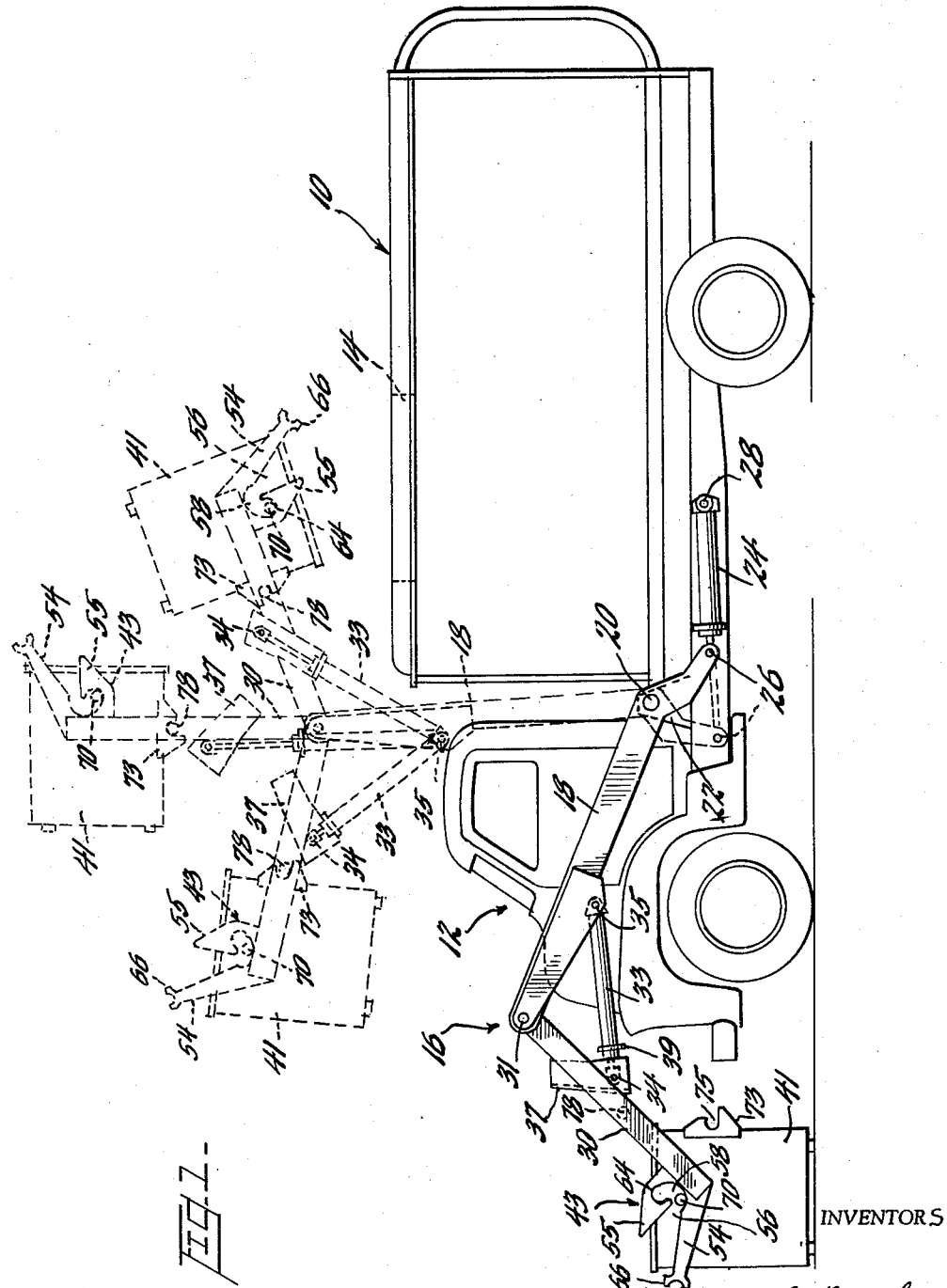

Referring in more detail to the drawings, Figure 1 shows a vehicle having a cargo body 10 and a cab section 12. The cargo body may be entirely open at the top or may be provided with a partial opening, such as indicated at 14, extending transversely across the body 10. The vehicle is equipped with a double arm loading mechanism of the type disclosed in the patent to James E. Owen, 2,441,-591, issued May 18, 1948. The loading mechanism essentially comprises a pair of arm units 16 mounted on opposite sides of the vehicle. The arm units and operating means therefor are identical on opposite sides of the vehicle and therefore only one side is shown in Figure 1. The arm units each comprises lifting arm 18 supported on a pivot shaft 20 carried by a bearing block 22 which is attached to the vehicle. Each arm 18 is operated by a double acting cylinder and piston unit 24 which is pivotally attached to the arm at 26 and pivotally attached to the vehicle at 28. Each arm unit 16 further comprises a second arm 30 pivotally connected at 31 to the lifting arm 18. Each arm 30 is operated by a single acting cylinder and piston unit 33 which is pivotally attached to the arm 30 at the point 34 and to the adjacent arm 18 at the point 35.

In order to limit the pivotal movement of arms 30 about arms 18, a channel-shaped stop plate 37 may be welded across each arm 30 for engagement with a collar 39 on the cylinder portion of each unit 33. A conventional hydraulic pump and valve system, not shown, is provided for operating the cylinder and piston units 24 and 33. One suitable pump and valve system is shown in the patent of James E. Owen, 2,441,591, issued May 18, 1948. As shown in Figure 1, the unit 24 moves lifting arms 18 between the lowered position shown in solid lines and the raised position shown in dotted lines, and the unit 33 moves the second arms 30 through the arc shown by the dotted line sequence in Figure 1. The rearmost position shown dotted in Figure 1 is considered to be the raised or dumping position in which the bucket or container 41 is located directly over opening 14 in the cargo body.

According to the invention, a hook member 43 is rigidly secured to the free end of each of the second arms 30. As shown best in Figure 2, the second arms 30 are formed by two spaced plates 45 and 46 and the hook members 43 are formed from plate material and are welded between the free ends of plates 45 and 46. Although it is not necessary for the purposes of this invention, a particularly efficient arrangement for the cylinder and piston unit 33 is indicated in Figure 2. In such an arrangement the unit 33 operates within the arms 18 and 30, rather than to the side of said arms. In order to accomplish such arrangement, the arms 18 are made of inner spaced plates 48 and 49 to which are welded, respectively, outer plates 50 and 51. The outer ends of plates 50 and 51 are bent outwardly away from plates 48 and 49 to provide recesses for the reception of plates 45 and 46 which are pivotally supported in said recesses by the pins 31.

The hook members 43 will now be described as they appear in the lowered position as shown solid in Figures 1 and 2. Each hook member 43 comprises a lower prong 54 and a shorter upper prong 55 forming between them a generally J-shaped slot indicated generally at 56. Slot 56 has a stem portion 57 which increases in width toward the open end of the slot and a foot portion 58 of substantially constant width. The upper prong 55 has a barb 59 directed away from the tip of the prong. It will be seen that the prongs 54, 55 have the mutually facing edges 60 and 61, respectively. Edge 60 slopes generally downwardly from the tip of prong 54 to a point adjacent the tip of barb 59. It should also be noted that foot 58 of each of the slots 56 extends upwardly from a heel portion 63 and to a toe portion 64, and that the heel 63 extends below the edge 60. The tip of each prong 54 has an upwardly extending hook 66, forming a curved portion 67 at the end of edge 60. In addition, a groove 68 is formed in the tip of each prong 54. The purposes of the detailed construction of hook members 43 will now be described in connection with the specific design of container 41.

The container 41 which is used in combination with the hook members 43 has attached to opposite sides thereof the trunnions 70 which are slideably and rotatably received in the J-shaped slots 56. The trunnions 70 are positioned above the center of gravity of container 41 so that the container tends to hang vertically. The container may be maneuvered along the ground by engaging trunnions 70 behind hooks 66 and backing the vehicle, or by engaging the trunnions in grooves 68 and driving the vehicle forwardly. It will be noted in Figure 2 that the ends of the trunnions are provided with flanges 71 to help guide the vehicle operator in positioning the trunnions within the slots 56. The flanges 71 have been omitted from the showing in Figure 1 in order that the various positions of the trunnions within the slots may be more clearly observed.

The structure thus far described operates in the following manner. The vehicle with arm units 16 lowered is driven to a position directly in front of container 41 at which time slots 56 are in line with trunnions 70. Next, the procedure is to move the vehicle slightly forward until trunnions 70 are located between the tips of prongs 54 and 55 and then raise arms 18 or 30 slightly so trunnions 70 will slide down edges 60 to the heels 63 of the J-shaped slots 56. Next the lifting arms 18 are raised to the position shown dotted in Figure 1, and during such movement trunnions 70 slide along the feet 58 of the slots from the heels 63 toward the toes 64, as shown in the dotted forward position in Figure 1. Finally, the cylinder and piston units 33 are expanded to rotate arms 30 around their pivots 31 to the dumping or rearward position shown dotted toward the right of Figure 1. During this final movement, trunnions 70 slide into the toes 64 of the slots and are thus held when the container is in the dumping position. It will be seen that the structure thus far described provides means for detachably engaging container 41 and raising it to the dumping position but does not include means for overturning the container in unison with the overturning movement of arms 30. Therefore, the container could only be emptied if it had bottom doors which could be opened when it reached the dumping position.

Means for overturning the container will now be described in connection with Figures 1 and 2. Ears 73 are welded on opposite sides of container 41 and extend beyond the container toward the vehicle when the container is in the lowered position. Each of said ears is recessed to form a groove 75 which opens toward the vehicle when the container is in the lowered position. Said ears are designed to cooperate with a bar 78 which is secured between the second arms 30. It should be noted in Figure 1 that the distance between the trunnions 70 and the grooves 75 is substantially equal to the distance between the bar 78 and the toes 64 of slots 56. With such cooperating arrangement of ears 73 and bar 78, the operation of the loading mechanism is as follows: As the lifting arms 18 are raised to the position shown dotted in Figure 1, thereby moving second arms 30 to the position shown dotted at the left of Figure 1, container 41 tends to remain vertical under the influence of gravity and thus rotates counter-clockwise relative to hook members 43 until bar 78 is received within slot 75, and by the time container 41 has been moved to the dumping position shown dotted toward the right of Figure 1, bar 78 is completely received within slot 75 so that container 41 is securely locked.

In order to facilitate an understanding of the invention, reference has been made to the embodiments thereof shown in the accompanying drawings and detailed descriptive language has been employed. It will nevertheless be understood that no limitation of the invention is thereby intended and that various changes and alterations are contemplated such as would ordinarily occur to one skilled in the art to which the invention relates.

Having thus described the invention, what is claimed as new and desired to be secured by Letters Patent is:

1. In combination with a self-loading cargo vehicle of the type having two spaced arm units pivotally supported on said vehicle for simultaneous rocking movement between a lowered position in which the free ends of said arm units extend beyond the plan outline of said vehicle and a raised position in which the free ends of said units are overturned above the cargo body of said vehicle, the improvement comprising two hook members, one attached to the free end of each of said arm units, each said hook member having a slot therein, a container having trunnions extending from opposite sides and above the center of gravity thereof, each of said trunnions being slidably and rotatably received in one of said slots, said slots being formed respectively with arcuate inner end portions for rotatably supporting said trunnions and for permitting relative rotation and bodily sliding movement of said trunnions and said container toward the pivotal supports of said arms responsive to raising of the arms, means responsive to such rotational and sliding movement for locking the container against rotation in either direction comprising a bar carried by said arms between said container and said pivotal support, and means on said container defining a groove opening generally toward said bar for reception of said bar at a predetermined point in the raising of said arms.

2. In combination with a self-loading cargo vehicle of the type having two spaced arm units pivotally supported on said vehicle for simultaneous rocking movement between a lowered position in which the free ends of said arm units extend beyond the plan outline of said vehicle and a raised position in which the free ends of said units are overturned above the cargo body of said vehicle, the improvement comprising two hook members, one connected to the free end of each of said arm units, each of said hook members comprising two prongs having mutually facing inner edges, said inner edge of one of said prongs having a barb thereon directed away from the tip of said one prong, said barbed prong being positioned above the other of said prongs when said hook members are in said lowered position, and said barbed prong being positioned below said other prong when said hook members are in said raised position.

3. The combination claimed in claim 2 in which said mutually facing inner edges converge from the tips of said prongs to said barb.

4. The combination claimed in claim 2 in which said edge of said other prong slopes downwardly from the tip of said other prong toward the position of said barb when said hook member is in said lowered position.

5. The combination claimed in claim 2 in which said other prong has a hook at the tip thereof, said hook extending upwardly from said other prong when said hook members are in said lowered position.

6. The combination claimed in claim 2 in which said other prong is longer than said barbed prong.

7. In combination with a self-loading cargo vehicle of the type having two spaced arm units pivotally supported on said vehicle for simultaneous rocking movement between a lowered position in which the free ends of said arm units extend beyond the plan outline of said vehicle and a raised position in which the free ends of said units are overturned above the cargo body of said vehicle, the improvement comprising two hook members, one connected to the free end of each of said arm units, each of said hook members having a generally J-shaped slot therein, the stem of each of said slots opening generally away from said vehicle when said hook members are in said lowered position, and the foot of each of said slots extending generally upwardly when said hook members are in said lowered position, a container having trunnions extending from opposite sides thereof above the center of gravity of the container, said trunnions being slideably and rotatably received in said slots, whereby as said hook members are raised from said lowered position to said overturned position, said trunnions will slide around the foot of each of said slots from heel to toe and be caught in the toes of the slots when in said raised position, means forming a groove on said container, said groove opening toward said vehicle when said container is in said lowered position, and a bar connected between said arm units and receivable within said groove as said container is moved toward said raised position.

8. The combination claimed in claim 7 in which the distance between said trunnions and said groove is substantially equal to the distance between said bar and the toe of said slot.

9. In combination with a self-loading cargo vehicle of the type having two spaced arm units pivotally supported on said vehicle for simultaneous rocking movement between a lowered position in which the free ends of said arm units extend beyond the plan outline of said vehicle and a raised position in which the free ends of said units are overturned above the cargo body of said vehicle, the improvement comprising two hook members, one attached to the free end of each of said arm units, each of said hook members having a slot therein, a container having trunnions extending from its opposite sides and above its center of gravity, each of said trunnions being slidably and rotatably received in one of said slots, said slots being formed respectively with arcuate inner end portions for supporting said trunnions and for permitting relative rotation and bodily sliding movement of said trunnions and container toward the pivotal support of said arms respensive to raising of the arms, said arms and said container respectively having cooperating means thereon responsive to such rotational and sliding movement for locking the container against rotation in either direction.

References Cited in the file of this patent

UNITED STATES PATENTS

| | | |
|---|---|---|
| 1,753,756 | Small | Apr. 8, 1930 |
| 2,441,591 | Owen | May 8, 1948 |
| 2,624,478 | Kaplan | Jan. 6, 1953 |

FOREIGN PATENTS

| | | |
|---|---|---|
| 409,488 | France | Feb. 19, 1910 |
| 509,594 | France | Aug. 21, 1920 |